No. 759,005. PATENTED MAY 3, 1904.
G. W. McLEOD.
PARING KNIFE.
APPLICATION FILED NOV. 2, 1903.
NO MODEL.
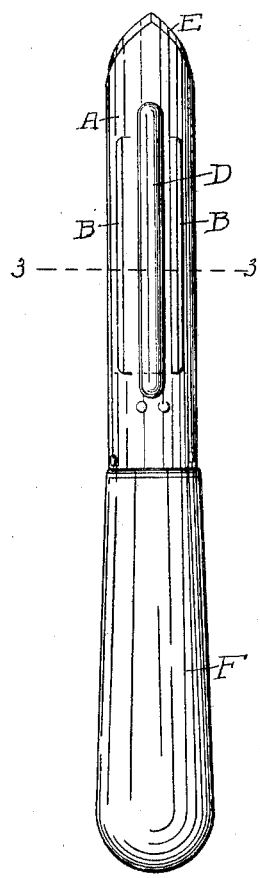
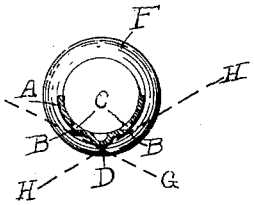
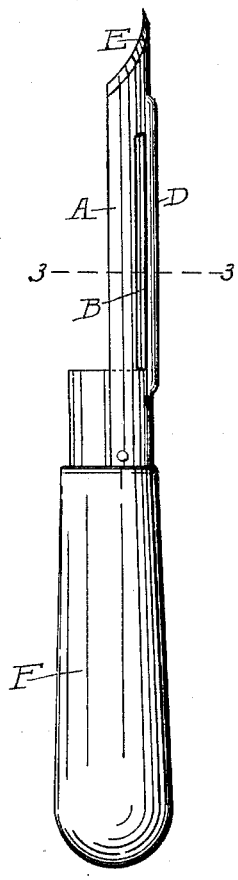
WITNESSES:
J. H. Hill
Ernest Mock.
INVENTOR.
Geo. W. McLeod
BY G. W. Bullard
ATTORNEY.

No. 759,005.  Patented May 3, 1904.

UNITED STATES PATENT OFFICE.

GEORGE W. McLEOD, OF TACOMA, WASHINGTON.

PARING-KNIFE.

SPECIFICATION forming part of Letters Patent No. 759,005, dated May 3, 1904.

Application filed November 2, 1903. Serial No. 179,575. (No model.)

*To all whom it may concern:*

Be it known that I, GEORGE W. McLEOD, a citizen of the United States, residing at 1207 South O street, city of Tacoma, in the county of Pierce and State of Washington, have invented certain new and useful Improvements in Paring-Knives, of which the following is a specification.

My invention is particularly designed to be used in cutting the peels from vegetables and fruits, as potatoes and apples.

The object of my invention is to enable the cook and housekeeper to do this kind of work more rapidly and with less waste than with an ordinary paring-knife.

My invention is also useful in slicing fruits and vegetables after the same are peeled.

I attain these objects by means of the device illustrated in the accompanying drawings, in which—

Figure 1 is a side view of the knife. Fig. 2 is a front view of the same, and Fig. 3 is a cross-section of the knife at 3 3.

Similar letters refer to similar parts in the several views.

My invention comprises a semicylindrical longitudinally-double-slotted knife-blade A, the inner edges B B of said slots C C being bent outwardly and sharpened into cutting edges, as indicated in Fig. 3. A raised rib D, stamped in the blade between the cutting edges B B, adds stiffness and strength to the cutting-blade and forms a gage to keep the cutting edges at a proper angle with the surface of fruit or vegetable being peeled or sliced. The semicircular blade is made with a sharpened V-shaped point E, designed to be used in cutting the sunken surfaces, as potato-eyes, from the article being peeled.

The semicircular blade, made as herein described, is mounted on a suitable handle F, which completes my invention. Each edge of the knife may be used alternately by cutting to and from the person or to the right and left, the knife being alternately turned to bring the cutting edges into the surface, as indicated by broken lines G G and H H.

It will be observed that the knife is equally useful to a right or left handed person.

Having described my invention, what I claim as new, and desire to secure by Letters Patent, is—

1. A paring-knife comprising a semicylindrical blade, said blade having two longitudinal slots, the inner edges of said slots being outwardly bent and made into cutting edges; a central stiffening-rib between said cutting edges, and said semicylindrical blade mounted on a suitable handle, substantially as described, and for the purposes set forth.

2. A paring-knife comprising a semicylindrical blade formed with a V-shaped cutting-point, said blade having two longitudinal slots, the inner edges of said slots being outwardly bent and sharpened into cutting-knives; a stiffening-rib between and parallel with said cutting-knives, and said semicircular blade mounted on a suitable handle, as shown and described and for the purposes set forth.

In testimony whereof I affix my signature in presence of two witnesses.

GEO. W. McLEOD.

Witnesses:
J. L. McMURRAY,
I. H. HILL.